United States Patent [19]
Price et al.

[11] 3,788,126
[45] Jan. 29, 1974

[54] PULSED END-BURNING T-BURNER

[76] Inventors: Edward W. Price, 511 B Lexington;
Homer B. Mathes, 36 B Vieweg Circle, both of China Lake, Calif. 93555

[22] Filed: Mar. 28, 1973

[21] Appl. No.: 345,620

[52] U.S. Cl. .................................................. 73/35
[51] Int. Cl. ........................................... G01n 33/22
[58] Field of Search ......................................... 73/35

[56] References Cited
UNITED STATES PATENTS

| | | | |
|---|---|---|---|
| 3,613,434 | 10/1971 | Schwarz et al. | 73/35 |
| 3,374,661 | 3/1968 | Foner et al. | 73/35 |

*Primary Examiner*—James J. Gill
*Attorney, Agent, or Firm*—R. S. Sciascia, Roy Miller; G. F. Baker

[57] ABSTRACT

A device is provided for the purpose of measuring the oscillatory combustion response of burning propellants to imposition of incident pressure oscillations, and to measure the damping rate of imposed oscillations (primarily due to damping by particles or droplets of condensed phase reaction products). The method uses artificially imposed oscillations to permit measurement of effect of oscillation with propellants that do not spontaneously produce oscillations.

The propellant samples to be tested are bonded in place at opposite ends of a T-shaped burner such that burning takes place on the facing surfaces only. Samples are prepared with precise uniformity of thickness and ignited as uniformly as possible by igniting with a coating of "paint-on" pyrotechnic which ignites almost instantaneously when the pilot igniter material is started by an electrically heated bridge wire.

13 Claims, 5 Drawing Figures

PULSED END-BURNING T-BURNER

BACKGROUND OF THE INVENTION

This invention relates to the testing and evaluation of solid propellants and more particularly to the testing of aluminized solid propellants using a T-Burner[1] technique. (1. Price, E. W., H. B. Mathes, O. H. Madden, and B. G. Brown. "Pulsed T-Burner Testing of Combustion Dynamics of Aluminized Solid Propellants," ASTRONAUT AERONAUT, Vol. 10, No. 4, Apr. 1972, pp. 65–67.)

Conventional T-Burner methods were generally not suitable for making the specified measurements with aluminized propellants. The standard technique and device in use for unaluminized propellants was only suitable for certain ranges of pressure and frequency in which oscillation occurred spontaneously.[2] (2. The committee of Standarization Combustion Instability Measurements in the T-Burner of the ICRPG Working Group on Solid Propellant Combustion. "T-Burner Manual," Interagency Chemical Rocket Propulsion Group, comp. and ed. by Chemical Propulsion Information Agency. Silver Spring, Md., CPIA, November 1969. CPIA Publ. No. 191.) Under certain rare conditions this method also was suitable for aluminized propellants.[3] (3. Beckstead, M. W., H. B. Mathes, E. W. Price, and F. E. C. Culick. "Combustion Instability of Solid Propellants," Twelfth Symposium (International) on Combustion, The Combustion Institute, Pittsburgh, Pa., 1969, pp. 203–11.) The evolution of these and related burners is traced in a publication by Price, Mathes and Crump.[4] (4. Price, E. W., H. B. Mathes and J. E. Crump. "Evolution of Laboratory T-Burners For Study of Solid Propellant Combustion Instability," Naval Weapons Center Technical Note 608-109, Rev. 1, Aug. 26, 1972.)

SUMMARY OF THE INVENTION

According to the present invention an improved T-Burner is provided which uses pulses to produce decaying oscillations which provide a means of determining $\alpha_c$ and $\alpha_d$. This permits extension of the T-Burner method to test conditions that could not previously be studied (e.g., aluminized propellants, higher and lower frequencies, relatively stable propellants).

DESCRIPTION AND OPERATION

Figure 1:
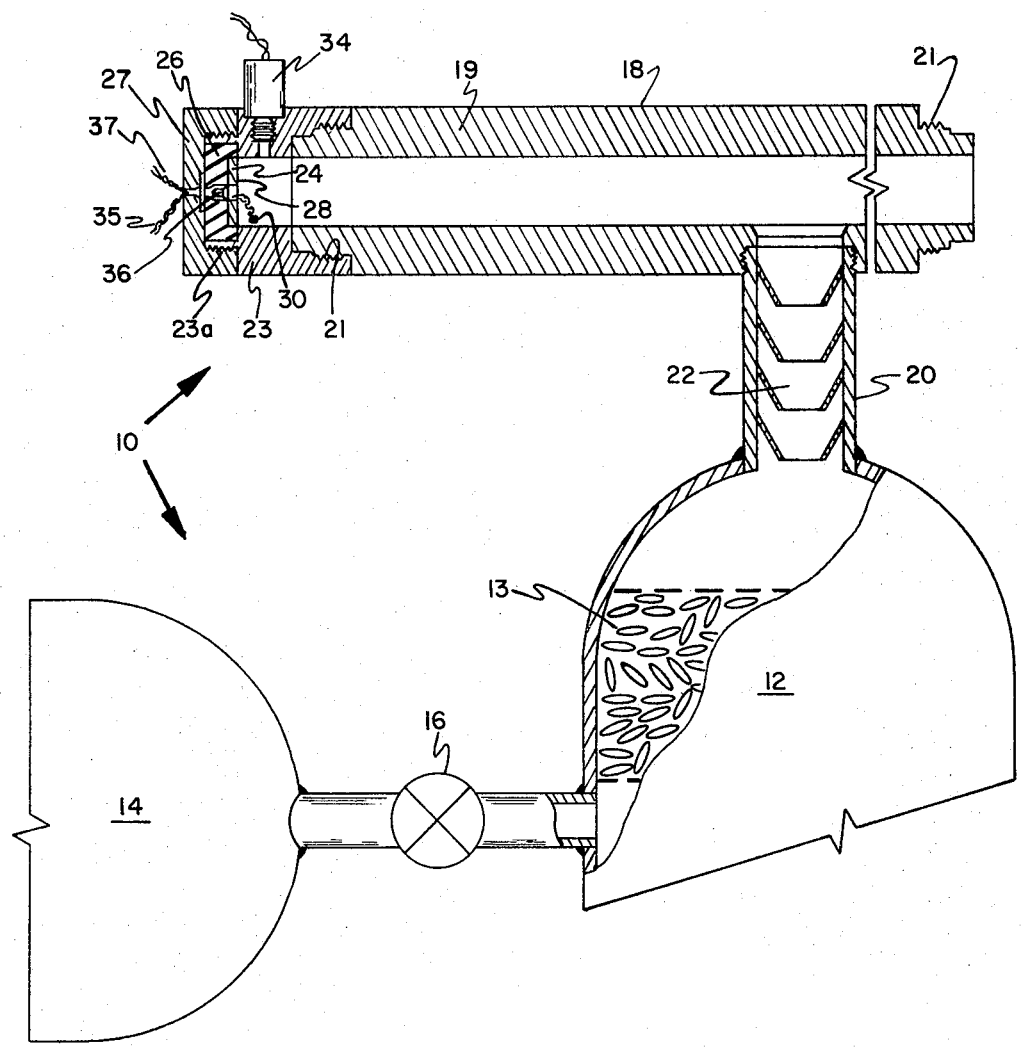
FIG. 1 is a schematic illustration of a T-Burner testing arrangement according to the invention.

FIG. 1 depicts a typical pulsed T-Burner test arrangement 10 comprising a pair of surge tanks 12, 14 connected together with a valve 16 therebetween. The T-Burner 18 is connected to surge tank 12 through a connecting pipe 20 having a series of conical baffles 22 therein to permit easy passage of gasses out of the T-Burner, but relatively high resistance to gas flow in the reverse direction. At opposite ends of T-Burner 18, propellant samples 24 are placed so as to permit combustion on the facing surfaces only.

The T-Burner 18 consists of a tubular body threaded at 21 on each end to receive an adaptor 23. The adaptor 23 is, in turn, threaded at 23a to receive an end cap 27. Adaptor 23 has a chamber 25 on the outboard side to snugly receive a plastic carrier 26 against an obturating ring 25a. The carrier 26 has the propellant sample 24 adhesively attached, for example, flush with its inboard face 26a. Carrier 26 has a central bore 29 in which a squib 36 is inbedded in a potting compound 33. Squib 36 is essentially a charge of black powder which is packaged to be set off electrically through wires 37.

The samples 24 are manufactured with precise uniformity of thickness, and ignited as uniformly as possible, to assure a flat burning surface and simultaneous burnout over the entire surface. This is accomplished by igniting with a paint-on pyrotechnic 28 that ignites almost instantaneously when the pilot igniter material of quick match 30 is ignited. Uniform sample thickness assures abrupt and simultaneous burnout of the samples. One or more commercially available high frequency pressure transducers 34 may be mounted in the burner to detect the pressure variations that occur during and shortly after burning of the propellant samples.

Figure 3:
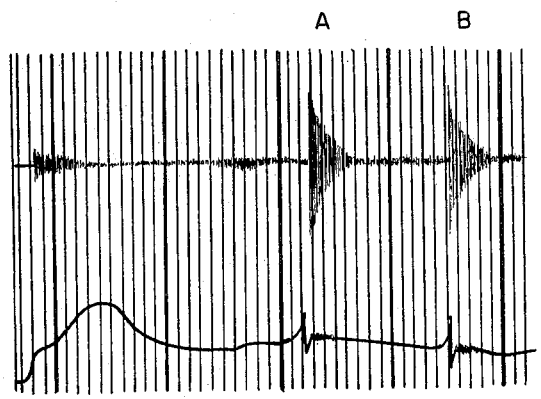
FIG. 3 is a graph of a Pulsed T-Burner test record.

After ignition and a brief period of burning to allow approach to equilibrium flow in the system, the pulse unit 36 is fired, and produces a decaying oscillation A shown graphically in FIG. 3. Immediately after burnout, the pulse unit (not shown) at the opposite end of tube 19 is fired, producing another decaying oscillation B.

The first pulse A in FIG. 3 is taken to be indicative of combustion alpha ($\alpha_c$) acting concurrently and additively with the damping alpha ($\alpha_d$), to give the observed alpha ($\alpha_1$), in the expression for pressure oscillations.

$$\Delta p = \Delta p_0 e^{(\alpha_c - \alpha_d)}$$

(1)

Where the alphas are treated as positive. The second pulse B is taken to be the system damping, $\alpha_d$, so that $\alpha_c$ can be determined from $$\alpha_c - \alpha_d = \alpha_c - \alpha_2 = -\alpha_1; \; \alpha_c = \alpha_2 - \alpha_1$$

Thus the method supplies $\alpha_c$ in terms of measured quantities $$\alpha_c = \alpha_2 - \alpha_1$$

(2)

and $$\alpha_d = -\alpha_2$$

(3)

for columnar gas oscillations and pressure waves perpendicularly incident on the burning surface. In the T-Burner configuration the other loss effects are small and $\alpha_d$ is a measure of particulate or droplet damping (evident by comparison with results obtained with propellant having no condensed phase products).

The procedure differs from the standard method (2. supra) by use of pulsed oscillations in the absence of spontaneous ones. The products of reaction of the propellant flow towards the center of the burner, where they depart by vent pipe 20 into a pressure-control system such as the surge tanks 12, 14 in FIG. 1.

The valve 16 permits retention of the less contaminated part of the pressurization gas for reuse. Further, a small differential pressure between the two tanks during burning is equalized at burnout, and the corresponding pressure decline in the T-Burner 18 marks the time of burnout. The first surge tank 12 contains a bed of chains 13 through which the burner exhaust must flow: the amount of heat given up to the chains is large enough to substantially reduce the surge tank volume required for a specified pressure control. The connecting pipe 20 between the T-Burner and surge tank is made with a series of conical baffles 22 used to permit easy passage of gas out of the burner, but high resistance to gas flow in the reverse direction: this tends to reduce oscillations between burner and tank.

Figure 2:
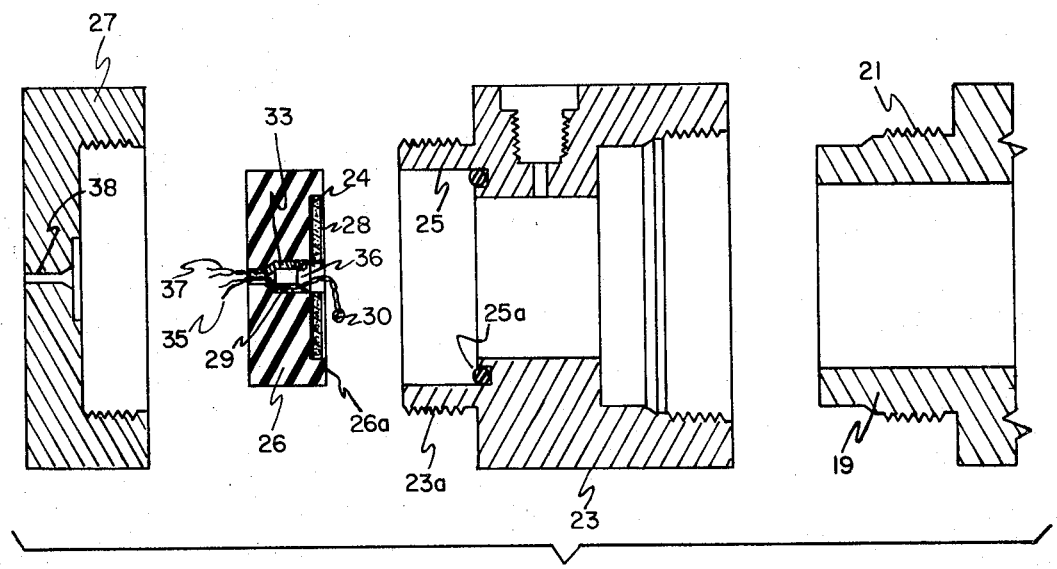
FIG. 2 is an enlarged detail exploded view of one end of the T-Burner of FIG. 1.
Figure 2A:
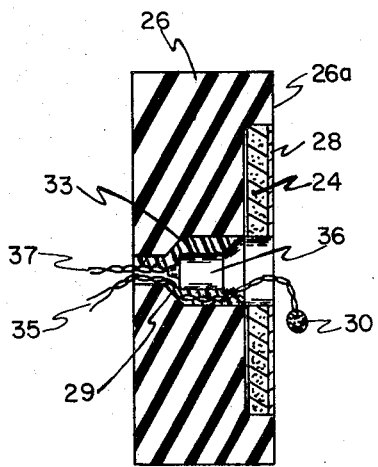
FIG. 2a is an enlarged detail view of the carrier shown in FIG. 2.

The burner itself has some novel features of which the most notable is the use of an electrically actuated black powder pulse unit 36 which produces the pulsed oscillation. Mounting of the initiator on the burner axis as shown in FIGS. 1 and 2 is often preferable, but diagonal wall mounting may prove desirable to increase the number of pulses or minimize excitation of the second acoustic mode. Another useful feature is the loading of propellant, igniter and pulser in a single plastic cup 26, FIG. 2, which can be inserted integrally into the motor for expeditious loading and testing. Many of these units can be prepared in advance of testing, an advantage in scheduling manpower and facilities.

Figure 4:
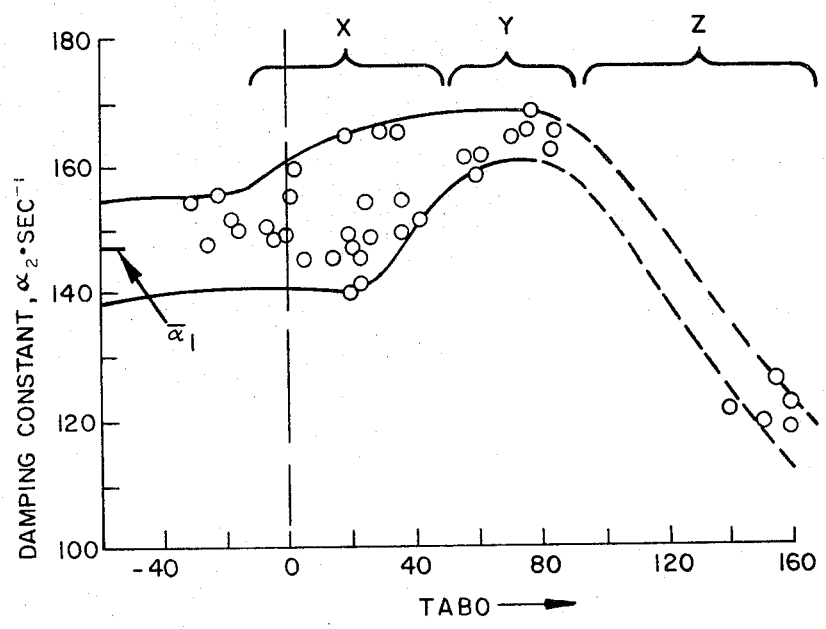
FIG. 4 is a graph showing Pulse Decay rate (second pulse) with respect to time after burnout.

Three aspects of the data reduction merit particular attention (see FIGS. 3 and 4). First, the pulse decay does not follow Equation 1 precisely, as the alphas vary with pressure and it is necessary to report test results (alphas) at particular pressures. Second, the pulse after burnout (PABO) usually is at a somewhat lower frequency than the pulse during burning (PDB), and the subtraction indicated in Equation 2 cannot be carried out unless $\alpha_2$ and $\alpha_1$ can be referred to the same frequency. This is usually done by a measured or estimated function of $\alpha_2$ vs. $f$. Measured functions are obtained by testing in different burner lengths. Third, there is some uncertainty as to the accuracy of the assumption $\alpha_2 = \alpha_d$ —even if corrected for frequency. This difficulty arises from changes occurring after burnout. FIG. 4 shows values of $\alpha_2$ measured from tests which were pulsed at different times after burnout (TABO). A brief period of changing $\alpha_2$ occurs in the vicinity of TABO = (X), reflecting the declining contribution of combustion (which never occurs in a perfectly abrupt fashion). Then there is usually a time interval of constant $\alpha_2$ (Y) (typically from 0.05 – 0.09 seconds after burnout). This is followed by a rapid decline in $\alpha_2$ (Z) associated with dropping frequency and probably with back flushing of surge chamber gas into the T-Burner (due to more rapid cooling of the burner) and cessation of the period of equalization of the two surge tank pressures. The alphas measured from pulses fired during the neutral 0.05 – 0.09 second interval are taken to be representative of combustor damping, making due allowances for slightly low frequency noted before.

Although in the preferred embodiment of the invention shown and described, the propellant samples are arranged as discs with directly opposing burning faces, it will be understood by workers in the field that other geometric shapes are not only possible but desirable in certain inventigations, as for example wherein torroidal samples are arranged with burning faces coaxial with the burner tube and preferably flush with the inner surface of the tube at the time the pulse is introduced.

We claim:

1. Apparatus for investigation of and measuring combustion dynamics of solid propellants comprising:
   means for enclosing and positioning solid propellant samples in opposed facing relationship;
   means for igniting the opposing faces of said propellant samples;
   means associated with each said propellant sample for producing pressure pulses within the enclosing means; and
   transducer means connected for sensing phenomena occurring within said enclosing means.

2. The apparatus of claim 1 and pressure surge absorbing means communicating with the interior of said enclosing means.

3. The apparatus of claim 2 wherein said means for enclosing comprises:
   an elongated cylindrical tube;
   adapter means attached to each end of said tube;
   end caps attached to each said adaptor means;
   carrier means positioned within each said adaptor means; and
   each said carrier means carrying;
   one of said propellant samples,
   one said ignition means, and
   one said pulse producing means.

4. The apparatus of claim 3 wherein said carrier comprises:
   a plastic disc body having inner and outer faces;
   removable end pieces;
   a central bore;
   a counterbore; and
   a recess opening on said inner face;
   a solid propellant sample filling said recess and having a central bore coaxial with said counterbore and an exposed surface flush with the inner surface of said body;
   an electric match having an electrically ignitable mass and electrical conductors attached thereto;
   said conductors of said match being threaded through said bores and said counterbore so that said match hangs in close proximity of said exposed surface of said propellant; and
   said pulsing means being adhesively mounted in said counterbore.

5. The apparatus of claim 4 wherein said pulsing means comprises an electrically ignitable charge of black powder.

6. Apparatus according to claim 2 wherein said surge absorbing means include:
   a pressure tank; and
   a pipe connecting said tank to said enclosing means for pressure communication therebetween.

7. Apparatus according to claim 6 wherein said pipe contains a plurality of frustoconical baffles each having a larger end and a smaller end;
   said baffles being oriented such that the smaller ends are on the side toward said tank.

8. Apparatus according to claim 6 wherein said tank contains a mass of metallic chains or the like lying athwart said tank spaced from said pipe and from the opposite end of said tank.

9. Apparatus according to claim 8 and a second surge tank communicatingly attached to said first mentioned tank by means of a second pipe and said mass of chains being positioned in said first mentioned tank between said first mentioned pipe and said second pipe.

10. The apparatus of claim 2 wherein said enclosing means and said surge means are connected by a passageway including baffles designed to permit relatively easy flow of gasses from said enclosing means into said surge means and relatively more difficult the flow of gasses from said surge means into said enclosing means.

11. A method for measuring the combustion dynamics of solid propellants comprising the steps of:

confining identical sample pieces of propellant material in a relatively closed elongated chamber spaced from each other in facing relationship such that the inner faces of said samples constitute substantially the entire end surfaces of said chamber;

simultaneously igniting the inner surfaces of said samples;

subsequently causing pressure pulses in said chamber; and sensing phenomena occurring within said chamber.

12. The method of claim 11 wherein one of said pressure pulses is introduced after ignition of said samples but before burnout and another pulse is caused after burnout.

13. The method of claim 12 wherein said second pulse is caused between 30 and 90 msec after burnout.

* * * * *

UNITED STATES PATENT OFFICE
CERTIFICATE OF CORRECTION

Patent No. 3,788,126            Dated 29 Jan 1974

Inventor(s) Edward W. Price and Homer B. Mathes

It is certified that error appears in the above-identified patent and that said Letters Patent are hereby corrected as shown below:

The data on page 1 should include the following:

[73] Assignee: The United States of America as represented by the Secretary of the Navy Signed and sealed this 26th day of November 1974.

(SEAL)
Attest:

McCOY M. GIBSON JR.
Attesting Officer

C. MARSHALL DANN
Commissioner of Patents